2,959,485

CONCENTRATED SWEETENED CREAM AND PROCESS OF PRODUCING SAME

Raymond W. Bell and Arjen Tamsma, Washington, D.C., assignors to the United States of America as represented by the Secretary of Agriculture No Drawing. Filed Apr. 16, 1958, Ser. No. 729,036

7 Claims. (Cl. 99—55)

(Granted under Title 35, U.S. Code (1952), sec. 266)

A non-exclusive, irrevocable, royalty-free license in the invention herein described throughout the world for all purposes of the United States Government, with power to grant sublicenses for such purposes, is hereby granted to the Government of the United States of America.

In an earlier patent application (Serial No. 657,463, filed May 6, 1957), one of us has described a new stable sweetened cream product. This product was found to have the disadvantages that it becomes sandy under certain conditions and will churn readily when whipped.

It is an object of the present invention to provide an improved stable sweetened cream product of increased physical stability and having less tendency to churn when whipped. In accordance with the present invention the aforementioned disadvantages are alleviated by lowering the nonfat milk solids (NFMS) content and subjecting the mixture to a viscosity-increasing treatment such as homogenization. For some special purposes, a heat treatment may be substituted for homogenization or combined therewith.

In particular this invention relates to a pasteurized, concentrated sweetened cream product containing from 20–60% milk fat and a NFMS-to-fat ratio of about 0.05 to approximately 0.5 and in which the sucrose-in-water percentage is about 60 to 65 and is sufficiently high to produce an osmotic pressure of such magnitude that microorganisms will not grow, and in which the viscosity is at least of such magnitude as to cause the insoluble solids to remain uniformly dispersed.

By "pasteurized" we mean all temperature and holding combinations of heating between those conditions which have been defined for the pasteurization of milk and those conditions which will almost result in a sterile concentrated sweetened cream.

The U.S. Federal Standard prescribes that sweetened condensed milk must contain not less than 8.5 percent milk fat and not less than 28.0 percent total milk solids. Although no standard of composition has been established for the new stable sweetened cream product the approximate percentages of milk fat, sucrose, water and NFMS may be given as 40, 30, 20 and 10, respectively.

A typical sweetened condensed milk composition and that of a product made according to the present invention are given below:

|  | Sweetened Condensed Milk, Percent | Sweetened Cream Product, Percent |
|---|---|---|
| Milk fat | 9.0 | 41.0 |
| Sucrose | 44.0 | 32.0 |
| Water | 27.0 | 21.0 |
| NFMS | 20.0 | 6.0 |

As indicated by the above table it is possible, in the sweetened cream product, to store above five times the amount of milk fat contained in a conventional sweetened condensed milk while at the same time reducing the sugar content. In fact this difference in fat content can be as high as sevenfold. Moreover, the NFMS-to-fat ratio has been altered radically from that of natural milk or of condensed milk. Increasing the fat content of condensed milk, either plain or sweetened, by concentration, that is, by further removal of water, without altering the NFMS-to-fat ratio is limited by the tendency of the product to gel.

The stable concentrated sweetened cream of the present invention provides a new and economically attractive means of preserving milk fat for long periods, with little or no refrigeration, and the product can be readily formulated in ice cream, bakery products, candy and other comestibles, and upon dilution with water can be whipped like the corresponding mixture of fresh cream and sucrose.

Unlike sweetened condensed milk, forewarming and condensing operations are not performed. However, it is necessary to heat the usual blended ingredients, cream, sucrose and nonfat dry milk (NFDM) to insure freedom of the finished product from germs and viruses of milk-borne diseases, and from quality-jeopardizing bacteria, yeasts, molds and milk enzymes. Although satisfactory results have been obtained by pasteurizing in the conventional manner (143° F. for 30 minutes), a more severe and quality improving heat treatment is preferred, such as 200° F. for 15 seconds or longer. If desirable, the product can even be heated sufficiently to sterilize it. In the dairy industry a heat treatment which can be made a part of a continuous, as contrasted with a batch, operation is preferred. Also, as will be explained, it is beneficial to carry out this and other steps in such a way as to minimize the incorporation of air.

When concentrated sweetened cream of 20 percent moisture content contains 8 percent, and even somewhat less, NFMS, lactose may crystallize during unrefrigerated storage, particularly when storage is of long duration. Of course, when the NFMS content is higher than about 8 percent and the temperature is lower than 70° F., or thereabouts, there is an even greater tendency for the lactose to crystallize and cause the product to be described as gritty, grainy, or sandy. In accordance with this invention the tendency to become grainy is eliminated by reducing the NFMS content to below 8 percent and preventing de-emulsification by increasing the viscosity to the level where fat separation will not occur.

In accordance with a prefered aspect of this invention the sweetened cream product is homogenized either just before or immediately after it is pasteurized. This step (1) greatly stabilizes the emulsion and effectively prevents concentration of fat near the surface where it would deteriorate faster than the fat in the remainder of the sample, (2) lessens the possibility that a separate liqiud phase will form in the bottom portion, (3) makes possible an increase in viscosity to the desired level without the danger of sandiness, and (4) decreases the tendency of the modified sweetened cream product to churn when it is whipped.

Homogenization of high-fat content cream only enormously increases its viscosity but destabilizes the emulsion. Homogenization of the cream and sucrose mixture does not substantially increase the viscosity. We have discovered that, in order to substantially increase the viscosity, it is necessary to include some NFMS in addition to those that are a part of the cream. We prefer 5 or 6 pounds of high- or low-heat conventionally made or "instant" NFDM per 100 pounds of 65 percent cream and 52 pounds of sucrose. However, it should be understood that we do not intend to limit ourselves to this precise formula, nor to the type of homogenizer used, nor the pressure employed. The quantity of sucrose in any event should be sufficient to produce an osmotic pressure at which microorganisms will not grow.

Much of the advantages of homogenization can be attained by carrying out the operation at a pressure of 1000 pounds per square inch. Higher pressures are beneficial.

Regarding the amount of NFDM to include in the formulation it will be obvious that this will depend upon numerous factors such as the anticipated commercial life of the product, the temperature at which the modified sweetened cream is to be held, how the product is to be used and the economic and commercial advantages in adding or not adding extra NFMS. In general, the amount to include should be as large as possible without encountering sandiness. Where sandiness is not considered undesirable, as when the product is to be used in the making of ice cream, the NFMS content of the modified sweetened cream product may exceed 10 percent.

We do not wish to be limited to NFDM as a source of NFMS. Condensed skim milk of high solids content could be used in combination with very rich cream. An example of this formulation is 100 pounds of 80 percent cream, 50 pounds of sucrose and 20 pounds of 45 percent solids content condensed skim milk.

*Example 1*

Milk is heated by any practical and convenient means to a temperature well above the range within which the fat will be in a liquid state, such as 145° F., and separated to yield a cream that contains 65% fat, more or less, preferably more, and to 100 pounds is added a mixture of 52 pounds of sucrose and 6 pounds of high grade NFDM. They may be added singly but addition as a mixture facilitates dispersion of the NFDM in the cream. Addition at this time of either the sucrose or the NFDM or both not only facilitates the uniform distribution of these solids, but it exposes their microbial population to the heat treatment that follows. Since 100 pounds of 65% fat content cream contains about 3 pounds NFMS, the mixture contains about 6% NFMS and about 20% water.

After thorough mixing the product is pumped through a heat exchanger where the temperature is quickly elevated to 200° F. or thereabouts, and preferably higher rather than lower, held at this temperature for 15 seconds, more or less, forced through an homogenizing valve at 1,000 p.s.i. pressure, thence and continuously through a cooling coil where the temperature is lowered by cold water to below about 130° F. and finally into a suitable receptacle, preferably a stainless steel vacuum chamber where incorporated air is removed under a commercial vacuum. The product is then, and while still warm, packaged in cans or other containers, care being exercised to prevent the reincorporation of air and further unnecessary exposure to air. An effective way to accomplish this is to cause the product to flow into sterile cans in a stream of steam, each container being filled to the point where there will be a minimum of head space, and the can is sealed in vacuum. While we prefer the use of an hermetically sealed container there are other types of packages that can be used, such as a polyethylene bag in a rigid or semirigid parent container or a 5 or 10 gallon can such as is utilized to store frozen cream.

*Example 2*

Milk is heated and separated to yield a cream that contains 65 percent fat. To the uncooled cream is added sucrose at the rate of 52 pounds/100 pounds of cream (or sucrose and corn sugar or other suitable sweetening agent in the circumstances) and 6 pounds of NFDM on the same basis; and the 3 constituents are thoroughly mixed. Then, by product to product regeneration by means of an appropriate heat exchanger, the temperature is increased to a heat intensity that will depend upon the temperature of the raw material being heated and that of the pasteurized product as it comes from the holder. Then the product is homogenized at 1,000 p.s.i., the homogenizer acting as a pump in the line. From the homogenizer the modified sweetened cream is heated by a heat exchanger or steam injection to the desired pasteurizing temperature, such as 200° F., is held 15 seconds, more or less, at this temperature, flows thence to the regenerative section heretofore mentioned and to an unheated vacuum chamber where the temperature is lowered to that corresponding to the vacuum, that is, the pressure, within the chamber; the product is cooled thereby with release of moisture, air and entrapped gases to a suitable conventional condenser, and the finished product is held therein for packaging.

After months of storage at room temperature products of Examples 1 and 2 are not stratified but are homogeneous in composition and are not sandy.

Instead of pasteurizing the modified sweetened cream as indicated, it can be heated to a higher temperature and held for a longer time, which causes it to increase in viscosity and to have a lower viable microbial content. It is then cooled and deaerated and the unhomogenized product is packaged with little or no reincorporation of air or microbial contamination. Since the product has relatively high heat stability, there is little effect on its physical properties except for the increase in viscosity and there is only a minor effect on the flavor.

Another preferred method which greatly increases the viscosity of the sweetened cream product of this invention is to can the deaerated mixture of cream, sucrose and NFDM, vacuum seal the can, and then heat it by the batch method as in the making of evaporated milk, but with the reel stationary after attaining the desired holding temperature. This gives a smoother and better bodied product than when the reel is revolved during the holding period. In this way the viscosity at 70° F. can be increased several fold relative to that of the unheated product or from 5,000 centipoises to 25,000. At the same time the heating imparts a mild to pronounced pleasing nutty and caramel-like flavor to the product, and the method avoids contamination from molds which are capable of growing on the surface of the canned food under favorable oxygen and temperature conditions. The increase in viscosity can be controlled by varying the length of time that the cans are held in the retort at the predetermined temperature which may be in the range of 150° (for pasteurization only) to 250° F. for 15 minutes. This method serves the dual purpose of not only controlling the viscosity but also of pasteurizing the product. Thus the separate pasteurizing step can be omitted.

There are numerous other processing sequences and temperature conditions as well as means for attaining them but those set forth above will serve to describe the essential features. While no temperature controls and recorders have been mentioned they can be included as the judgment of the operator determines. As the operation becomes standardized the operator will learn how to control the composition and other properties of his product and he will act accordingly.

We claim:

1. A process for producing a pasteurized, concentrated sweetened cream product which comprises providing a mixture containing about from 20–60% milk fat, non-fat milk solids in such amount that the non-fat milk solids-to-fat ratio is about from 0.05 to 0.5, and sucrose in such amount that the sucrose-in-water percentage is about from 60–65% and is sufficiently high to produce an osmotic pressure of such magnitude that microorganisms will not grow, and heating said mixture to a temperature and for a time sufficient to pasteurize it and to increase its viscosity to such magnitude that insoluble solids remain uniformly dispersed.

2. A process for producing a pasteurized, concentrated sweetened cream product which comprises providing a mixture containing about from 20–60% milk fat, non-fat milk solids in such amount that the non-fat milk solids-to-fat ratio is about from 0.05 to 0.5, and sucrose in such amount that the sucrose-in-water percentage is about from 60–65% and is sufficiently high to produce an osmotic pressure of such magnitude that microorganisms will not grow, heating said mixture to a temperature and for a time sufficient to pasteurize it and to increase its viscosity to such magnitude that insoluble solids remain uniformly dispersed, deaerating the heated mixture, and then packaging it with a minimum reincorporation of air.

3. A process for producing a pasteurized, concentrated sweetened cream product which comprises providing a mixture containing about from 20–60% milk fat, non-fat milk solids in such amount that the non-fat milk solids-to-fat ratio is about from 0.05 to 0.5, and sucrose in such amount that the sucrose-in-water percentage is about from 60–65% and is sufficiently high to produce an osmotic pressure of such magnitude that microorganisms will not grow, deaerating said mixture, packaging the deaerated mixture with a minimum reincorporation of air, sealing the packaged mixture under vacuum, and then heating to a temperature and for a time sufficient to pasteurize said mixture and to increase its viscosity.

4. A process for producing a pasteurized, homogenized, concentrated sweetened cream product which comprises providing a mixture containing about from 20–60% milk fat, non-fat milk solids in such amount that the non-fat milk solids-to-fat ratio is about from 0.05 to 0.5, and sucrose in such amount that the sucrose-in-water percentage is about from 60–65% and is sufficiently high to produce an osmotic pressure of such magnitude that microorganisms will not grow, homogenizing the mixture to increase its viscosity, deaerating the homogenized mixture, and then packaging it with a minimum reincorporation of air.

5. A pasteurized concentrated sweetened cream product of a viscosity sufficient to cause insoluble solids to remain uniformly dispersed containing about from 20–60% milk fat, non-fat milk solids in such amount that the non-fat milk solids-to-fat ratio is about from 0.05 to 0.5, and sucrose in such amount that the sucrose-in-water percentage is about 60 to 65% and is sufficiently high to produce an osmotic pressure of such magnitude that microorganisms will not grow.

6. A pasteurized, homogenized, concentrated sweetened cream product of a viscosity sufficient to cause insoluble solids to remain uniformly dispersed containing about from 20–60% milk fat, non-fat milk solids in such amount that the non-fat milk solids-to-fat ratio is about from 0.05 to 0.5, and sucrose is such amount that the sucrose-in-water percentage is about 60 to 65% and is sufficiently high to produce an osmotic pressure of such magnitude that microorganisms will not grow.

7. The product of claim 5 in which the non-fat milk solids-to-fat ratio is about 0.15.

References Cited in the file of this patent

UNITED STATES PATENTS

| | | |
|---|---|---|
| Re. 19,123 | Wendt | Mar. 27, 1934 |
| 2,150,944 | Sharples | Mar. 21, 1939 |
| 2,847,310 | Turnbow | Aug. 12, 1958 |

OTHER REFERENCES

Publication, "The Ice Cream Review," August 1937, pages 31, 32 and 64.